H. C. STRONG.
BRAKE FOR AUTO VEHICLES.
APPLICATION FILED MAR. 24, 1921.

1,433,491.

Patented Oct. 24, 1922.

Harold C. Strong
INVENTOR.

BY
Hazard & Miller
ATTORNEYS

Patented Oct. 24, 1922.

1,433,491

UNITED STATES PATENT OFFICE.

HAROLD C. STRONG, OF CLEARWATER, CALIFORNIA.

BRAKE FOR AUTO VEHICLES.

Application filed March 24, 1921. Serial No. 455,344.

*To all whom it may concern:*

Be it known that I, HAROLD C. STRONG, a citizen of the United States, residing at Clearwater, in the county of Los Angeles and State of California, have invented new and useful Improvements in Brakes for Auto Vehicles, of which the following is a specification.

It is the object of this invention to provide a brake particularly adapted to be employed in connection with the drive wheel of a motor vehicle.

The improved brake structure provides a device which will be positive and efficient in its action and which may be readily operated.

The invention will be readily understood from the following description of the accompanying drawings, in which—

Figure 1:
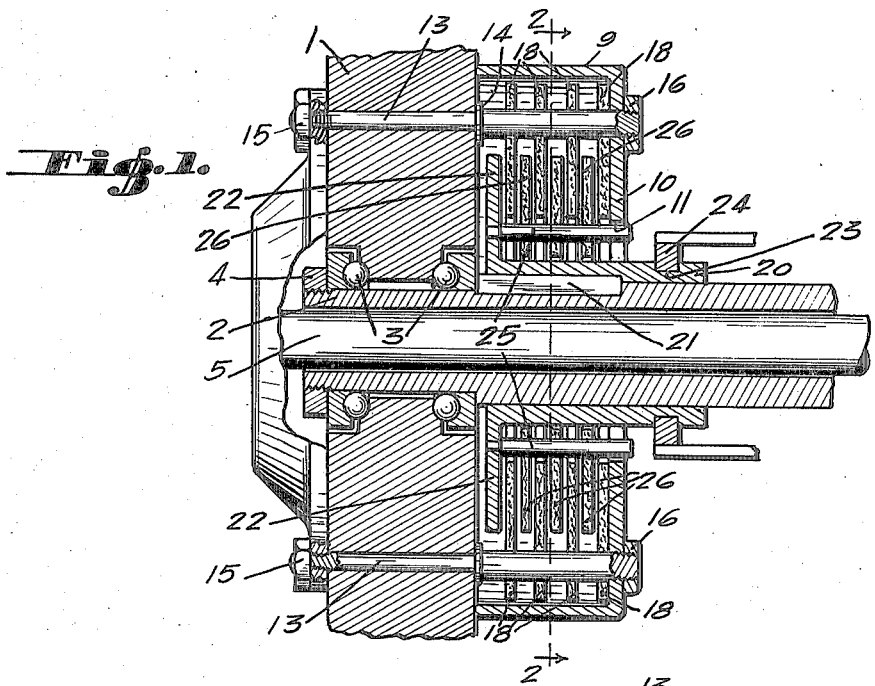
Figure 1 is a longitudinal section through a wheel and the improved brake.
Figure 2:
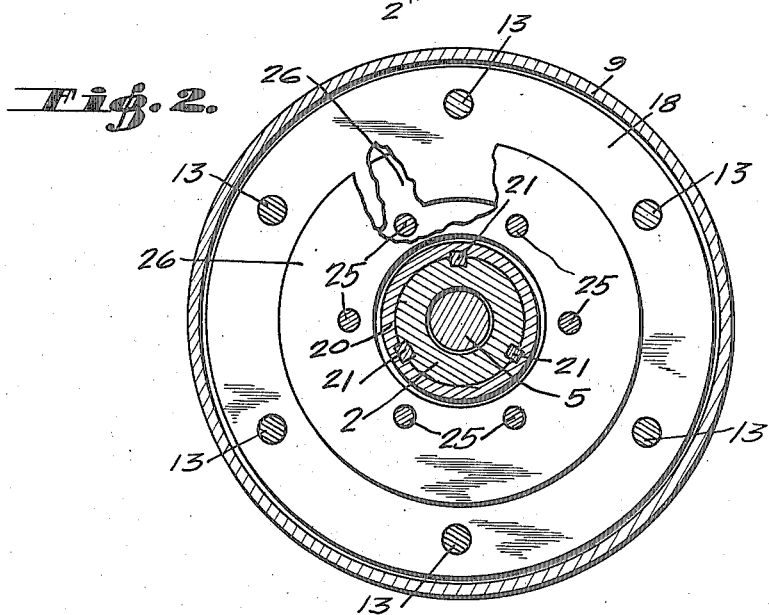
Fig. 2 is a transverse section on the line 2—2 of Fig. 1, partly broken away.

In the drawings I have shown a usual automobile wheel 1 mounted upon a usual axle housing 2 with an antifrictional bearing 3 interposed between the wheel and the axle housing, and a nut 4 threaded upon the end of the axle housing for retaining the wheel in position. A usual drive axle 5 rotates in the axle housing and projects beyond the same so as to be connected to a drive connection fixed upon wheel 1 in order to form a driving means for the wheel.

The improved brake includes a casing secured to the wheel 1 so as to surround the axle housing 2. This casing includes a peripheral portion 9 abutting at one edge against wheel 1 and having the side portion 10 extending inwardly from the other edge of the same to a point spaced an appreciable distance from axle housing 2 as shown at 11. The casing is retained in position by means of bolts 13 received through wheel 1 with shoulders 14 upon said bolts abutting against one side of the wheel, and nuts 15 threaded on to the ends of the bolt at the other side of the wheel. The bolts extend through the space within the casing and project through the end portion 10 of said casing with nuts 16 threaded onto the projecting ends of the bolts.

Frictional rings 18 of suitable material surround axle housing 2 in spaced relation therefrom within the casing carried by wheel 1, said frictional rings being slidably mounted upon bolts 13 for axial movement toward and away from one another.

A sleeve 20 is received upon axle housing 2 and is suitably keyed thereto as shown at 21 so as to be free for axial movement while being held against rotation upon the axle housing. The inner end of the sleeve terminates in a radially projecting flange 22 received within the casing secured to wheel 1 adjacent the surface of the wheel, and in order to axially shift sleeve 20, the end of the same which projects beyond the casing secured to wheel 1, is preferably grooved as shown at 23 so that a usual yoke 24 may engage the sleeve at said groove in order to axially shift the sleeve through any suitable operating connection.

Pins 25 extend axially from flange 22 radially beyond sleeve 20 so as to project beyond the brake casing at the space between the rear wall 10 of said casing and sleeve 20. A plurality of friction rings are mounted upon pins 25 and are disposed within the brake casing between adjacent ones of the friction rings 18. The friction rings 26 are free for sliding movement along the pins 25.

By the construction as thus described it will be seen that when yoke 24 is actuated so as to shift sleeve 20 toward wheel 1, the sides of friction rings 18 and 26 will be disengaged so that no braking action is produced, but when sleeve 20 is axially shifted in the opposite direction through its operating connection, the friction rings 18 and 26 are drawn toward end wall 10 of the brake casing and are clamped against one another and against said wall by the flange 22 of the axially movable sleeve. As a consequence a braking action is produced between the rotating friction rings 18 and the non-rotating friction rings 26, the degree of said braking action being varied, as found desirable, by varying the degree to which sleeve 20 is shifted. By this arrangement a relatively large braking surface is afforded, and as a consequence a very efficient brake is provided, but one which at the same time is extremely simple in construction and conveniently manipulated.

Various changes may be made without departing from the spirit of the invention.

What is claimed is:

A brake comprising the combination with an axle housing, an axle in the axle housing and a wheel suitably mounted and connected to the axle, of bolts fixed in the wheel and extending inwardly, a casing mounted against the inner face of the wheel around the bolts and having a side portion extending inwardly, said bolts extending through said side portion, nuts upon the bolts to hold the casing in place, frictional rings loosely surrounding the housing and slidingly mounted upon the bolts within the casing, a sleeve slidingly splined on the axle housing, a flange projecting from the end of the sleeve next to the wheel, pins fixed in the flange parallel with the bolts and inside of the frictional rings, second friction rings slidingly mounted upon the pins between the first friction rings, and means for sliding the sleeve to tighten or loosen the friction rings upon each other.

In testimony whereof I have signed my name to this specification.

HAROLD C. STRONG.